(12) United States Patent
Lin

(10) Patent No.: US 7,404,210 B2
(45) Date of Patent: Jul. 22, 2008

(54) METHOD AND APPARATUS FOR DEFENDING AGAINST DISTRIBUTED DENIAL OF SERVICE ATTACKS ON TCP SERVERS BY TCP STATELESS HOGS

(75) Inventor: Dong Lin, Fort Lee, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1033 days.

(21) Appl. No.: 10/668,952

(22) Filed: Sep. 23, 2003

(65) Prior Publication Data

US 2005/0060557 A1 Mar. 17, 2005

Related U.S. Application Data

(60) Provisional application No. 60/497,886, filed on Aug. 25, 2003.

(51) Int. Cl.
*G06F 11/00* (2006.01)
(52) U.S. Cl. .......................... 726/22; 370/392; 713/188
(58) Field of Classification Search ................ 726/22; 370/392; 713/188
See application file for complete search history.

(56) References Cited

U.S. PATENT DOCUMENTS

2006/0230129 A1* 10/2006 Swami et al. ............... 709/223

OTHER PUBLICATIONS

"More information on RST cookies" Clavister [Knowledge Base Article #1006], Published: Jun. 4, 2006, [on line] Interact: http://www.clavister.com/sup_port/kb/100061.*
Bernstein, D.J., "*SYN Cookies*," http://cr.yp.to/syncookies.html.
CERT Coordination Center, "*TCP SYN Flooding And IP Spoofing Attacks*," Sep. 1996. http://www.cert.org/advisories/CA-1996-21.html.
Lemon, J. "*Resisting SYN Flood DoS Attacks With A SYN Cache*," USENIX BSDCon 2002 Conference, San Francisco, CA. http://people.freebsd.org/~jlemon/papers/syncache.pdf.
Lin, D., "*Internet Congestion Control: Cooperative End-System And Gateway Algorithms*," Ph.D Thesis, Harvard University, 1998. http://www.eecs.harvard.edu/~dong/lin-thesis.ps.
"*Transmission Control Protocol*," prepared for Defense Advanced Research Projects Agency by Information Sciences Institute, J. Postel, Editor, Request for Comments (RFC) 793, Sep. 1981. http://www.faqs.org/rfcs/rfc793.html.
RAZOR Security Team, "*The Naptha DoS Vulnerabilities*," Nov. 2002. http://razor.bindview.com/publish/advisories/adv_NAPTHA.html.
"Requirements For Internet Hosts—Communication Layers," Internet Engineering Task Force, R. Braden, Editor, Network Working Group, Request for Comments (RFC) 1122, Section 4.2.3.6, Oct. 1989. http://www.faqs.org/rfcs/rfc1122.html.

* cited by examiner

*Primary Examiner*—Kambiz Zand
*Assistant Examiner*—Jacob Lipman
(74) *Attorney, Agent, or Firm*—Kenneth M. Brown

(57) ABSTRACT

A Distributed Denial-of-Service (DDoS) attack by a TCP stateless hog is defeated with use of an enhancement to the keep-alive mechanism provided by RFC 1122. A TCP server receives a new TCP connection request from a possible attacker and sends a keep-alive probe packet back thereto using an "invalid" sequence number. Illustratively, this "invalid" sequence number comprises a random number selected to be reasonably distant from the actual current sequence number. When a responsive packet is received from the potential attacker, the TCP server verifies the accuracy of the acknowledgement number in the received packet, thereby determining whether the potential attacker may be a TCP stateless hog.

16 Claims, 2 Drawing Sheets

METHOD AND APPARATUS FOR DEFENDING AGAINST DISTRIBUTED DENIAL OF SERVICE ATTACKS ON TCP SERVERS BY TCP STATELESS HOGS

CROSS-REFERENCE TO RELATED APPLICATION

The present application hereby claims the benefit of previously filed Provisional patent application Ser. No. 60/497,886, "Defense Against State Attacks On TCP Servers," filed by D. Lin on Aug. 25, 2003.

FIELD OF THE INVENTION

The present invention relates generally to the field of Internet security and more particularly to the problem of defending against certain forms of distributed denial of service (DDoS) attacks.

BACKGROUND OF THE INVENTION

Denial of service (DoS) attacks cause service disruptions when limited server resources are allocated to the attackers instead of to legitimate users. A distributed denial of service (DDoS) attack launches a coordinated DoS attack toward the victim from geographically diverse Internet nodes. The attacking machines are usually compromised zombie machines controlled by remote masters. The resources typically under attack include link bandwidth, server memory and CPU time. Distributed DoS attacks are more potent because of the aggregate effects of converging traffic, especially when the attackers have inside knowledge of the network topology. "TCP SYN flood," "smurf IP ping," and bandwidth attacks on root name servers are all examples of such attacks which have been previously deployed. (Each of these attacks will be familiar to those skilled in the art.) However, it has been reported that there have in fact been far more of such attacks than have been previously known.

There are numerous approaches to improve server operating systems to resist resource exhaustion. Some have considered better network protocol design principles to protect servers from attacks on stateful handshake protocols (familiar to those of ordinary skill in the art). IP trace back is another well-known approach—it is a network-wide coordinated effort to follow the offending packets back to their originators. However, such an approach obviously requires network-wide cooperation and coordination.

In fact, many previous attacks could have been prevented entirely if ingress filtering were deployed Internet wide or if a source address validation protocol were widely used. And, although many victims of recent bandwidth attacks were flooded by unspoofed ICMP reply packets, the corresponding ICMP echo requests were all spoofed. (As is well-known to those of ordinary skill in the art, a "spoofed" packet is one in which the source address is fictitious or fallacious.) Heuristic-based bandwidth attack detection by signatures have also been considered for monitoring and network congestion control. For example, one proposed approach classifies incoming packets into UDP, TCP, TCP SYN, and CGI categories (each of which is fully familiar to one of ordinary skill in the art), and then enforces class-based rate control and weighted fair queuing.

Moreover, DDoS attack tools may tend to mutate and evolve over time. With wider deployment of egress filtering, for example, attackers will undoubtedly exploit doors that are most likely to be left open (e.g., TCP, DNS). Attack signatures may change or disappear to evade detection. Thus, it is likely that sophisticated future attacks will become almost indistinguishable from legitimate ones. A filtering-based approach to the problem alone is, therefore, not only inefficient but also insufficient. Many false positives will force researchers to go back to the drawing board for new heuristics.

One particular type of DDoS attack on a TCP server can be launched by continuously creating new TCP connections with the targeted server until it runs out of memory and is therefore unable to accept service requests from legitimate users. (As is familiar to those of ordinary skill in the art, TCP is the well-known Department of Defense standard Transmission Control Protocol—see, e.g., "Transmission Control Protocol," prepared for Defense Advanced Research Projects Agency by Information Sciences Institute, J. Postel, editor, Request for Comments (RFC) 793, September, 1981, "www-.faqs.org/rfcs/rfc793.html." RFC 793 is hereby incorporated by reference as if fully set forth herein.) The deleterious effect of such an attack results from the fact that each established TCP connection necessarily creates a state on the TCP server, and therefore, the amount of allocated memory for storing these states is proportional to the total number of open connections. Such an attack has heretofore been named "Naptha," and is known as such by those skilled in the art, but it will be more generally referred to herein as a "TCP stateless hog" attack.

There is no known defense against TCP stateless hog (i.e., Naptha) attacks. However, a TCP keep-alive mechanism is well known to those of ordinary skill in the art as an official specification for the Internet community—see, e.g., "Requirements for Internet Hosts—Communication Layers," Internet Engineering Task Force, R. Braden, editor, Network Working Group, Request for Comments (RFC) 1122, section 4.2.3.6, October, 1989, "www.faqs.org/rfcs/rfc1122.html." (Section 4.2.3.6 of RFC 1122 is hereby incorporated by reference as if fully set forth herein.) This keep-alive mechanism may advantageously be invoked in server applications that might otherwise hang indefinitely and consume resources unnecessarily if a client crashes or aborts a connection during a network failure. Although such a keep-alive mechanism could in principle be used to alleviate the TCP server during an attack in-progress, it can easily be defeated without much cost for the attacker.

SUMMARY OF THE INVENTION

The present inventor has recognized that the keep-alive mechanism as provided by RFC 1122 can advantageously be modified (i.e., strengthened) in a manner which effectively detects and defeats a TCP stateless hog. Specifically, in accordance with the principles of the present invention, a TCP server receives a new TCP connection request from a possible attacker. Then, a keep-alive probe packet is advantageously sent by the TCP server to the potential attacker, but, in accordance with the principles of the present invention, the packet is sent using an "invalid" sequence number. In accordance with one illustrative embodiment of the present invention, this "invalid" sequence number advantageously comprises a random number which is selected to be reasonably distant from the actual current sequence number. Finally, when a responsive packet is received back from the potential attacker, the TCP server verifies the accuracy of the acknowledgement number in the received packet, thereby determining whether the potential attacker may be a TCP stateless hog.

DETAILED DESCRIPTION

Figure 1:
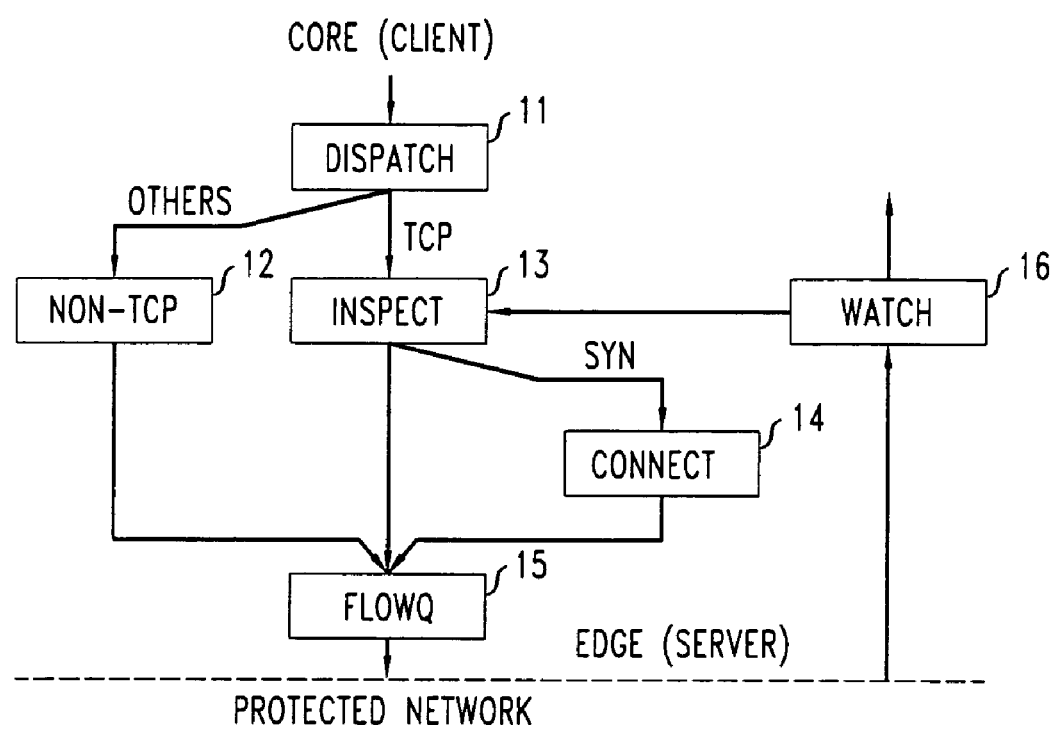
FIG. 1 shows a functional block diagram of a DDoS gateway which incorporates a TCP stateless hog defense mechanism in accordance with an illustrative embodiment of the present invention.

FIG. 1 shows a functional block diagram of a DDoS gateway which incorporates a TCP stateless hog defense mechanism in accordance with an illustrative embodiment of the present invention. The illustrative DDoS gateway is advantageously positioned at network edges, one hop upstream from the link to be protected. In operation of the illustrative gateway, packets arriving from the core are first dispatched by Dispatch module 11, to isolate TCP packets from others. (Non-TCP packets are handled by Non-TCP module 12.) Data packets with prior states at the gateway may be sorted into various queues, subject to certain buffer management policies, as determined by Inspect module 13. SYN packets, however, do not require prior states to be forwarded and are thus advantageously handled separately by Connect module 14. Data packets, SYN packets, and packets from non-TCP protocols are then scheduled to appear on the protected link by FlowQ module 15. For the reverse direction, packets from the TCP servers are examined by Watch module 16, and provide stateful information for further handling of incoming packets from the core. The TCP stateless hog detection mechanism in accordance with the illustrative embodiment of the present invention and as described in detail below may be advantageously incorporated into Watch module 16.

As is fully familiar to those of ordinary skill in the art, the TCP keep-alive mechanism as described in RFC 1122, Section 4.2.3.6, is typically invoked in server applications that might otherwise hang indefinitely and consume resources unnecessarily if a client crashes or aborts a connection during a network failure. Specifically, a keep-alive packet may be sent to a given connection when no data or acknowledgement packets (also known as ACKs) have been received for the connection within an interval. In response, it is expected that the receiver of the keep-alive packet will send an acknowledgement packet (an ACK) back. In accordance with the principles of the present invention, this very mechanism can advantageously be used to alleviate the TCP server during an attack in-progress.

Note, however, that the keep-alive mechanism as described in RFC 1122 can be easily defeated by a TCP stateless hog without much cost to the attacker. In particular, the attacking machines, which are usually victims of break-ins themselves, can merely respond to the keep-alive probes with an appropriate ACK, and effectively prevent the server from closing the connection. Specifically, the attacker simply crafts the returning ACK (acknowledgement packet) directly from the keep-alive packet it receives, by switching the fields of "sequence number" and "acknowledge number." The memory required on the attacking host is thereby constant and is unrelated to the number of TCP connections created for the attack.

However, in accordance with the principles of the present invention and an illustrative embodiment thereof, the TCP keep-alive mechanism is advantageously modified in a manner which effectively detects and defeats a TCP stateless hog attack. In accordance with one illustrative embodiment of the present invention, the instant inventive technique may be directly adapted into new or existing TCP implementations. In accordance with another illustrative embodiment of the present invention, the instant inventive technique may be deployed at network edges in DDoS gateways to protect legacy systems.

As if fully familiar to those of ordinary skill in the art, a keep-alive probe packet contains, inter alia, a sequence number corresponding to the latest data octet sent from the server to the client. The client is expected to respond with an acknowledgment in agreement with the same octet. Thus, as described above, in the absence of any modification to the keep-alive process, an attacker can simply answer the probe by copying the sequence number.

However, in accordance with the principles of the present invention, an "invalid" number is advantageously used as the sequence number in the keep-alive probe packets. Note, in particular, that in accordance with the TCP specification (i.e., RFC 793), the acknowledgment segment contains the current send-sequence number and an acknowledgment indicating the next sequence number expected to be received. Because TCP sequence numbers are 32 bit unsigned integers and wrap around, any number could in principle be a valid one. One possible "invalid" number, however, is the initial sequence number minus one. (This is, in some sense, the "least likely" valid number and thus the "most likely" invalid number.) Therefore, in accordance with one illustrative embodiment of the present invention, the initial sequence number minus one is used as an "invalid" sequence number in the keep-alive packet which is sent.

However, note that any fixed number or number generated by a fixed (i.e., deterministic) algorithm could potentially be guessed by an attacker, if the attacker knows the particular algorithm which is being used. Therefore, in accordance with another, preferred illustrative embodiment of the present invention, the "invalid" sequence number is advantageously chosen at random (i.e., with use of a random number generator). Moreover, in accordance with this preferred embodiment, in order to avoid potential confusion with numbers which may be currently in use by the connection, the selection space may advantageously be defined so that it is as far away from the current sequence number as possible. Note, for example, that it is quite unlikely that a TCP connection would exhaust the entire 32-bit integer space within one round-trip time. Thus, in accordance with this preferred illustrative embodiment of the present invention, the following formula is advantageously used to select the randomly chosen "invalid" sequence number, "keep-alive.seq":

$$\text{keep-alive.seq} = \text{snd\_una} - 2^{30} - \text{random}(2^{20}), \quad (1)$$

where "snd_una" is the smallest unacknowledged sender sequence number (i.e., the largest acknowledged sequence number plus one), and where "random($2^{20}$)" represents a randomly generated integer that is uniformly distributed between zero and 2 raised to the 20th power. Note in particular that Equation (1) above produces a 32-bit unsigned integer, and so underflows and overflows which occur in the calculation will wrap around—that is, the operations are all performed modulo $2^{32}$.

Note that the construction of a valid acknowledgment requires maintaining states on the responding host, just as is done in legitimate and conforming TCP implementations. Since the TCP specification (i.e., RFC 793) requires that the acknowledgment segment contains the current send-sequence number and an acknowledgment indicating the next sequence number expected to be received, all conforming TCP implementations are mandated to respond with the latest sequence number. A TCP stateless hog program will be unable to produce a correct response. Any incorrect response can easily be detected by the TCP server and the DDoS gateway. Therefore, connections associated with these incorrect responses answers can advantageously be removed with 100% accuracy.

Specifically, in accordance with an illustrative embodiment of the present invention, the illustrative DDoS gateway sends a keep-alive packet to the network source which initiated the establishment of the TCP connection, where the keep-alive packet comprises an invalid sequence number as described above. Then, the illustrative DDoS gateway operates as follows based on the response it receives (or doesn't receive) therefrom:

1. If the network source fails to respond to the keep-alive packet, the connection times out and is removed from the system, as is conventional and as specified by the keep-alive mechanism standard. Note that this could be either the result of a "dead" connection or the result of the fact that the network source is in fact a TCP stateless hog and is not programmed to (or able to) respond.

2. If the network source responds with a "correct" ACK (i.e., an acknowledgement packet with a "correct" acknowledgement number included therein), the connection is valid (i.e., the network source can be presumed to not be a TCP stateless hog) and it is maintained unmodified.

3. If the network source responds with an incorrect ACK (i.e., an acknowledgement packet with an "incorrect" acknowledgement number included therein), the connection is undoubtedly an invalid one (e.g., the network source is a TCP stateless hog). Thus, in accordance with an illustrative embodiment of the present invention, the connection is advantageously removed from the system in this case.

In particular, a correct response to the keep-alive packet should typically carry an acknowledgement number that is equal to (snd_una−1), or to a value that is slightly smaller in case packets are re-ordered in transit. Therefore, a "correct" acknowledgement number may advantageously be considered to be any value which is close to the value of "snd_una" (i.e., the smallest unacknowledged sender sequence number), while an "incorrect" acknowledgement number may advantageously be considered to be any value that has a large distance from "snd_una." Note that the subtraction of the term "$2^{30}$" in Equation (1) is advantageously used to produce such a large distance between the value of "snd_una" and the sequence number as included in the keep-alive packet.

In accordance with one illustrative embodiment of the present invention, if the acknowledgement number contained in the returned ACK is not within the range of (snd_una−W) through (snd_una), then the network source is considered to be a TCP stateless hog and the connection is advantageously removed. The term W is a small constant which advantageously allows for the condition where there are transient out of order packets. Illustratively, the maximum value of W may, for example, be set to be equal to the previous TCP congestion window size. (The TCP congestion window, which is well-known to those skilled in the art, is defined as part of the TCP standard, RFC 793, referenced above.) Note that if the connection has been idle for some period of time, W may advantageously be set to a value of zero.

In accordance with another illustrative embodiment of the present invention, the above-described method is strengthened by enforcing a dynamic per-host (or, alternatively, per-subnet) idle connection limit. Specifically, in accordance with this particular illustrative embodiment, the total number of idle connections per-host or per-subnet are monitored and sorted in real-time. When the total number of idle connections exceeds a pre-determined limit, a connection from the host or subnet with the most idle connections is advantageously replaced in favor of new arriving connections.

Figure 2:
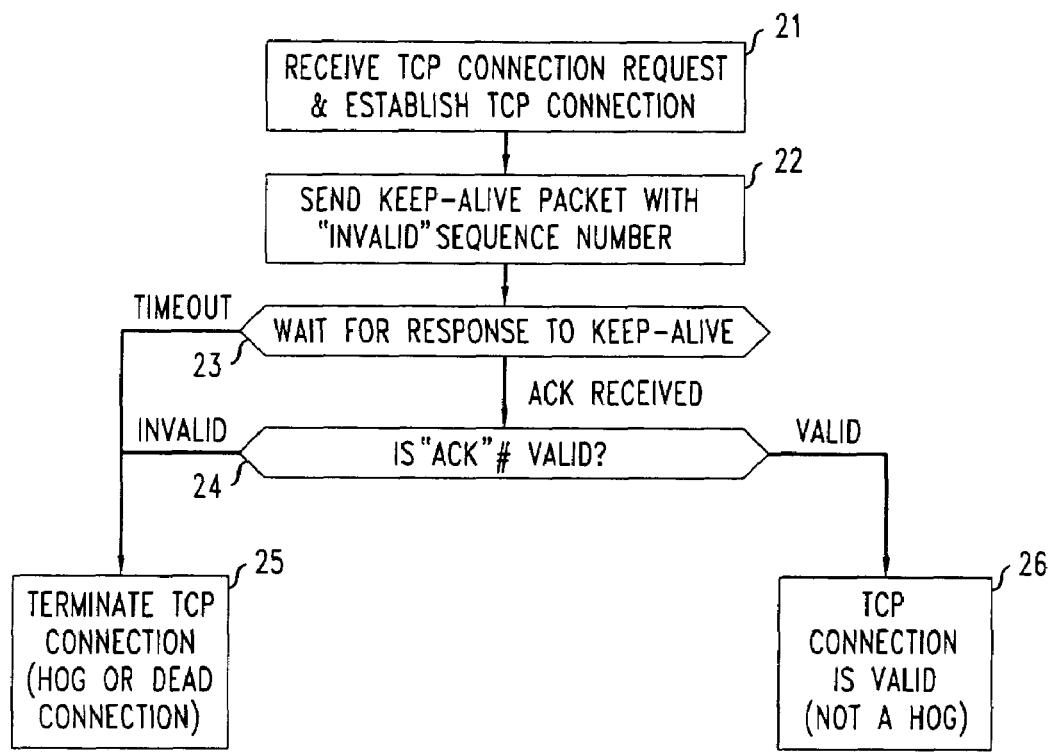
FIG. 2 shows a flowchart of a method for defending against a TCP stateless hog in accordance with an illustrative embodiment of the present invention.

FIG. 2 shows a flowchart of a method for defending against a TCP stateless hog in accordance with an illustrative embodiment of the present invention. First, block 21 receives a TCP connection request from a network source and establishes a TCP connection in response thereto. Then, in block 22, a keep-alive packet is sent to the network source which initiated the establishment of the given TCP connection, where the keep-alive packet comprises an invalid sequence number in accordance with the principles of the present invention, and illustratively as described above. Block 23 of the illustrative flowchart waits for a response to the keep-alive packet (i.e., an ACK), and if a timeout occurs (i.e., a response packet is not received within an appropriate, predetermined amount of time), flow proceeds to block 25, which terminates the given TCP connection (as is conventional). Otherwise, the contents of the response packet is examined in block 24 to determine whether the acknowledgement number is "correct" or "incorrect" (as defined above, for example). If it is correct, flow proceeds to block 26, and the connection is kept (i.e., it is presumed valid). If it is incorrect, however, flow proceeds to block 25 to terminate the given TCP connection, since it is presumed that either the connection was established by a TCP stateless hog, or else it is simply a dead connection.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

I claim:

1. A method for defending against a denial of service attack perpetrated by a TCP stateless hog, the method comprising the steps of:

receiving a TCP connection request from a network source and establishing a TCP connection in response thereto;

sending a keep-alive packet associated with said TCP connection to the network source, wherein said keep-alive packet comprises an invalid sequence number;

receiving a response to the keep-alive packet associated with said TCP connection from the network source; and determining whether the network source is a TCP stateless hog based on the received response.

2. The method of claim 1 further comprising the step of removing said TCP connection when said step of determining whether the network source is a TCP stateless hog has determined that the network source is a TCP stateless hog.

3. The method of claim 1 further comprising the steps of maintaining a numerical count of idle connections, and removing said TCP connection when said numerical count of idle connections exceeds a predetermined idle connection limit.

4. The method of claim 1 wherein the invalid sequence number is derived based on a randomly generated number.

5. The method of claim 4 wherein the invalid sequence number is derived further based on a current sequence number.

6. The method of claim 5 wherein the invalid sequence number is derived based on a formula which ensures that the invalid sequence number is numerically distant from the current sequence number.

7. The method of claim 5 wherein the received response comprises an acknowledgement number, and wherein the step of determining whether the network source is a TCP stateless hog comprises comparing the acknowledgement number to the current sequence number.

8. The method of claim 7 wherein the step of determining whether the network source is a TCP stateless hog comprises determining that the network source is a TCP stateless hog when the acknowledgement number is not within a predetermined numerical distance from the current sequence number.

9. An apparatus for defending against a denial of service attack perpetrated by a TCP stateless hog, the apparatus comprising:

means for receiving a TCP connection request from a network source and establishing a TCP connection in response thereto;

means for sending a keep-alive packet associated with said TCP connection to the network source, wherein said keep-alive packet comprises an invalid sequence number;

means for receiving a response to the keep-alive packet associated with said TCP connection from the network source; and means for determining whether the network source is a TCP stateless hog based on the received response.

10. The apparatus of claim 9 further comprising means for removing said TCP connection when said means for determining whether the network source is a TCP stateless hog has determined that the network source is a TCP stateless hog.

11. The apparatus of claim 9 further comprising means for maintaining a numerical count of idle connections, and means for removing said TCP connection when said numerical count of idle connections exceeds a predetermined idle connection limit.

12. The apparatus of claim 9 wherein the invalid sequence number is derived based on a randomly generated number.

13. The apparatus of claim 12 wherein the invalid sequence number is derived further based on a current sequence number.

14. The apparatus of claim 13 wherein the invalid sequence number is derived based on a formula which ensures that the invalid sequence number is numerically distant from the current sequence number.

15. The apparatus of claim 13 wherein the received response comprises an acknowledgement number, and wherein the means for determining whether the network source is a TCP stateless hog comprises means for comparing the acknowledgement number to the current sequence number.

16. The apparatus of claim 15 wherein the means for determining whether the network source is a TCP stateless hog comprises means for determining that the network source is a TCP stateless hog when the acknowledgement number is not within a predetermined numerical distance from the current sequence number.

* * * * *